(12) United States Patent
Weston et al.

(10) Patent No.: US 10,762,300 B1
(45) Date of Patent: *Sep. 1, 2020

(54) TECHNIQUES TO PREDICTIVELY RESPOND TO USER REQUESTS USING NATURAL LANGUAGE PROCESSING

(71) Applicant: Facebook, Inc., Menlo Park, CA (US)

(72) Inventors: Jason E Weston, New York, NY (US); Antoine Bordes, Brooklyn, NY (US); Alexandre Lebrun, Palo Alto, CA (US); Martin Jean Raison, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/227,673

(22) Filed: Dec. 20, 2018

Related U.S. Application Data

(63) Continuation of application No. 15/077,814, filed on Mar. 22, 2016, now Pat. No. 10,198,433.

(51) Int. Cl.
*G06F 40/35* (2020.01)
*G06F 3/0484* (2013.01)
*G06F 3/0482* (2013.01)
*G06F 16/332* (2019.01)

(52) U.S. Cl.
CPC ............ *G06F 40/35* (2020.01); *G06F 3/0482* (2013.01); *G06F 3/0484* (2013.01); *G06F 16/3329* (2019.01)

(58) Field of Classification Search
None
See application file for complete search history.

(56) References Cited

U.S. PATENT DOCUMENTS

| | | | |
|---|---|---|---|
| 9,189,514 B1* | 11/2015 | Myslinski | G06F 16/2365 |
| 2005/0105712 A1* | 5/2005 | Williams | G10L 13/027 |
| | | | 379/265.02 |
| 2015/0178371 A1* | 6/2015 | Seth | G06Q 30/02 |
| | | | 707/748 |
| 2015/0278348 A1* | 10/2015 | Paruchuri | G06F 16/3344 |
| | | | 707/771 |

* cited by examiner

*Primary Examiner* — Kevin Ky

(57) ABSTRACT

Techniques to predictively respond to user requests using natural language processing are described. In one embodiment, an apparatus may comprise a client communication component operative to receive a user service request from a user client; an interaction processing component operative to submit the user service request to a memory-based natural language processing component; generate a series of user interaction exchanges with the user client based on output from the memory-based natural language processing component, wherein the series of user interaction exchanges are represented in a memory component of the memory-based natural language processing component; and receive one or more operator instructions for the performance of the user service request from the memory-based natural language processing component; and a user interface component operative to display the one or more operator instructions in an operator console. Other embodiments are described and claimed.

20 Claims, 13 Drawing Sheets

600

Receiving a user service request from a user client.
602

Submitting the user service request to a memory-based natural language processing component.
604

Generating a series of user interaction exchanges with the user client based on output from the memory-based natural language processing component, wherein the series of user interaction exchanges are represented in a memory component of the memory-based natural language processing component.
606

Receiving one or more operator instructions for the performance of the user service request from the memory-based natural language processing component.
608

Displaying the one or more operator instructions in an operator console.
610

*FIG. 6*

TECHNIQUES TO PREDICTIVELY RESPOND TO USER REQUESTS USING NATURAL LANGUAGE PROCESSING

CROSS-REFERENCE TO RELATED APPLICATIONS

This application is a continuation of, claims the benefit of and priority to previously filed U.S. patent application Ser. No. 15/077,814 filed Mar. 22, 2016, entitled "TECHNIQUES TO PREDICTIVELY RESPOND TO USER REQUESTS USING NATURAL LANGUAGE PROCESSING", which is hereby incorporated by reference in its entirety.

This application is related to a U.S. patent application Ser. No. 14/881,352, "Generating Responses Using Memory Networks," filed on Oct. 13, 2015, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to predictively respond to user requests using natural language processing. Some embodiments are particularly directed to techniques to predictively respond to user requests using natural language processing in a messaging-driven personal service operator console. In one embodiment, for example, an apparatus may comprise a client communication component operative to receive a user service request from a user client; an interaction processing component operative to submit the user service request to a memory-based natural language processing component; generate a series of user interaction exchanges with the user client based on output from the memory-based natural language processing component, wherein the series of user interaction exchanges are represented in a memory component of the memory-based natural language processing component; and receive one or more operator instructions for the performance of the user service request from the memory-based natural language processing component; and a user interface component operative to display the one or more operator instructions in an operator console. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
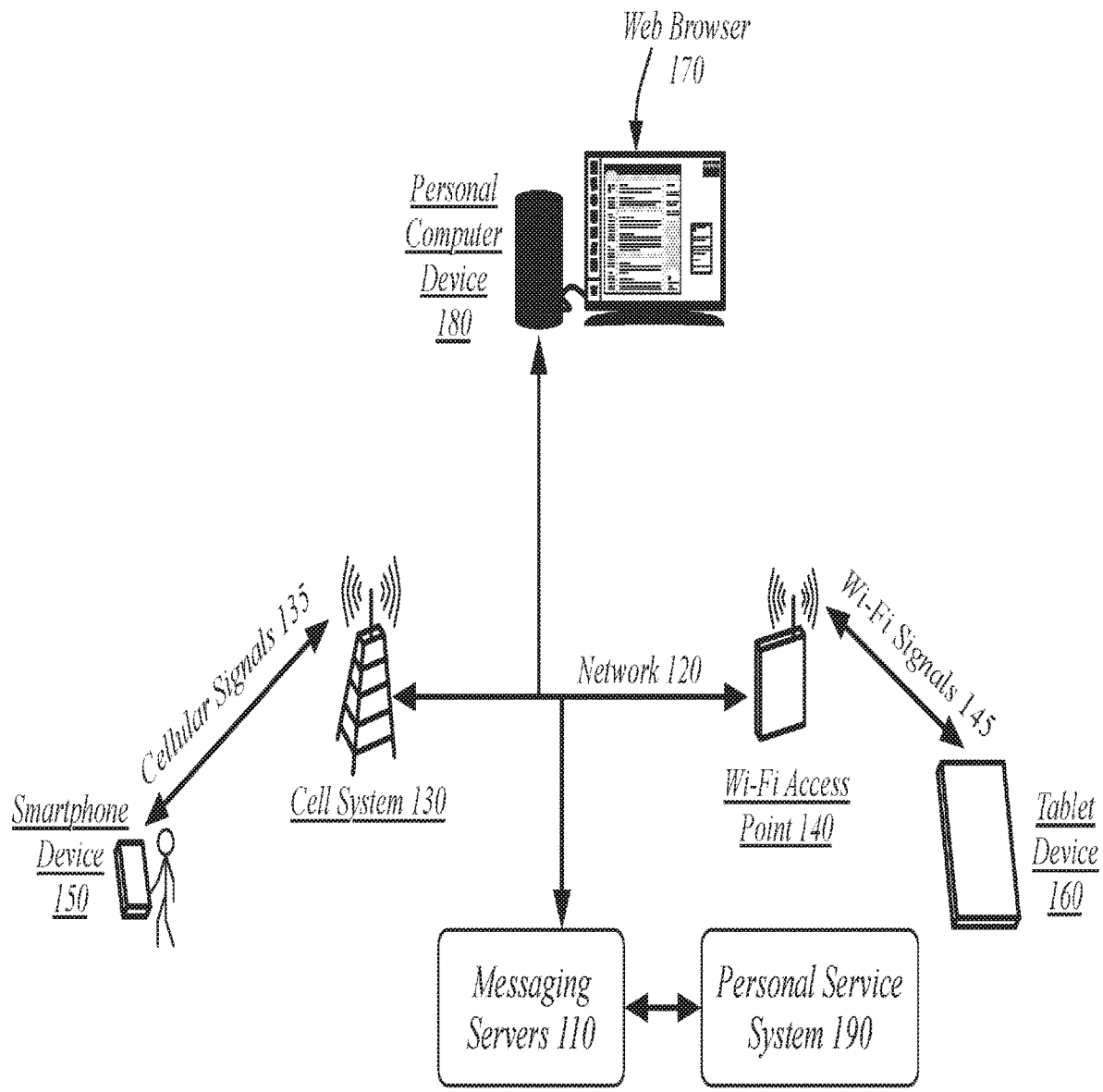
FIG. 1 illustrates an embodiment of a user request communication system.

A personal service system may provide the performance of various personal tasks for users of the system. In one case, a personal service system may connect a user to an operator via a messaging system, in which the user and the operator exchange messages to empower the user to request personal services and to exchange information related to the performance of the personal services. The operator may query the user as to details of the requested service using the messaging system and then perform the requested service on behalf of the user.

These services may be performed at least in part by human operators in order to accommodate the use of natural language requests by the users of personal service system. However, many requests may follow patterns that may become apparent through the repetition of similar requests. For instance, while different requests for making a reservation may have variations and differences, and the different responses to these requests may have variations and differences, these each may have sufficient similarities as to empower the performance of natural language processing (NLP) techniques to assist human operators.

Human operators may engage in messaging conversations with users of a personal service system, receiving requests and generating queries and responses. The human operators may perform various actions, such as making phone calls, accessing web sites, using applications, and other activities, in order to respond to the user requests. These actions and interactions may be recorded and analyzed by an NLP system. This NLP system may then be used to predict responses and actions on behalf of an operator and these predicted responses and actions suggested to the operator. Through this technique, the responses and actions of experienced operators may be learned by an automated system and suggested to other operators. The best responses and actions of any of the operators may be learned and suggested to other operators. In general, operators may be guided through the process of responding to requests by leveraging the automated analysis of previous responses. As a result, the embodiments can improve the affordability, scalability, and general performance of a personal service system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a user request communication system 100. In one embodiment, the user request communication system 100 may comprise a computer-implemented system having software applications comprising one or more components. Although the user request communication system 100 shown in FIG. 1 has a limited number of elements in a certain topology, it may be appreciated that the user request communication system 100 may include more or less elements in alternate topologies as desired for a given implementation.

A personal service system 190 may operate within a network environment including a messaging platform empowering the exchange of messages. The personal service system 190 may comprise a computer system with human operators receiving and responding to user requests. The personal service system 190 may use a messaging platform to exchange messages comprising the user requests and operator responses to the user requests. In some cases, the messaging platform may comprise a general messaging platform also used for other messages. In other cases, the messaging platform may comprise a messaging platform exclusive to the personal service system 190.

The messaging servers 110 may comprise one or more messaging servers operated by a messaging platform as part of the user request communication system 100. A messaging server may comprise an Internet-accessible server, with the network 120 connecting the various devices of the user request communication system 100 comprising, at least in part, the Internet.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110. A messaging client may empower access the personal service system 190, such as where the personal service system 190 is one of a plurality of endpoints and/or services accessible via the messaging servers 110.

The messaging client may be a component of an application providing additional functionality. For example, a personal service system 190 may provide a personal service application for accessing the personal service system 190. Similarly, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a personal service system 190 or social networking service, with the computing device providing additional functionality of the personal service system 190 or social networking service. Similarly, a personal service application or social networking application may provide both messaging functionality and additional functionality.

In some cases a messaging endpoint may retain state between user sessions and in some cases a messaging endpoint may relinquish state between user sessions. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A user request communication system 100 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members. A message thread may be between, for instance, a user and the personal service system 190, wherein the user accesses the message thread to engage in messaging with the personal service system 190 in order to submit requests and engage in a dialog regarding requests.

The user request communication system 100 may use knowledge generated from interactions in between users. The user request communication system 100 may comprise a component of a social-networking system and may use knowledge generated from the broader interactions of the social-networking system. As such, to protect the privacy of the users of the user request communication system 100 and the larger social-networking system, user request communication system 100 may include an authorization server (or other suitable component(s)) that allows users to opt in to or opt out of having their actions logged by the user request communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the user request communication system 100 and other elements of a social-networking system through blocking, data hashing, anonymization, or other suitable techniques as appropriate.

Figure 2:
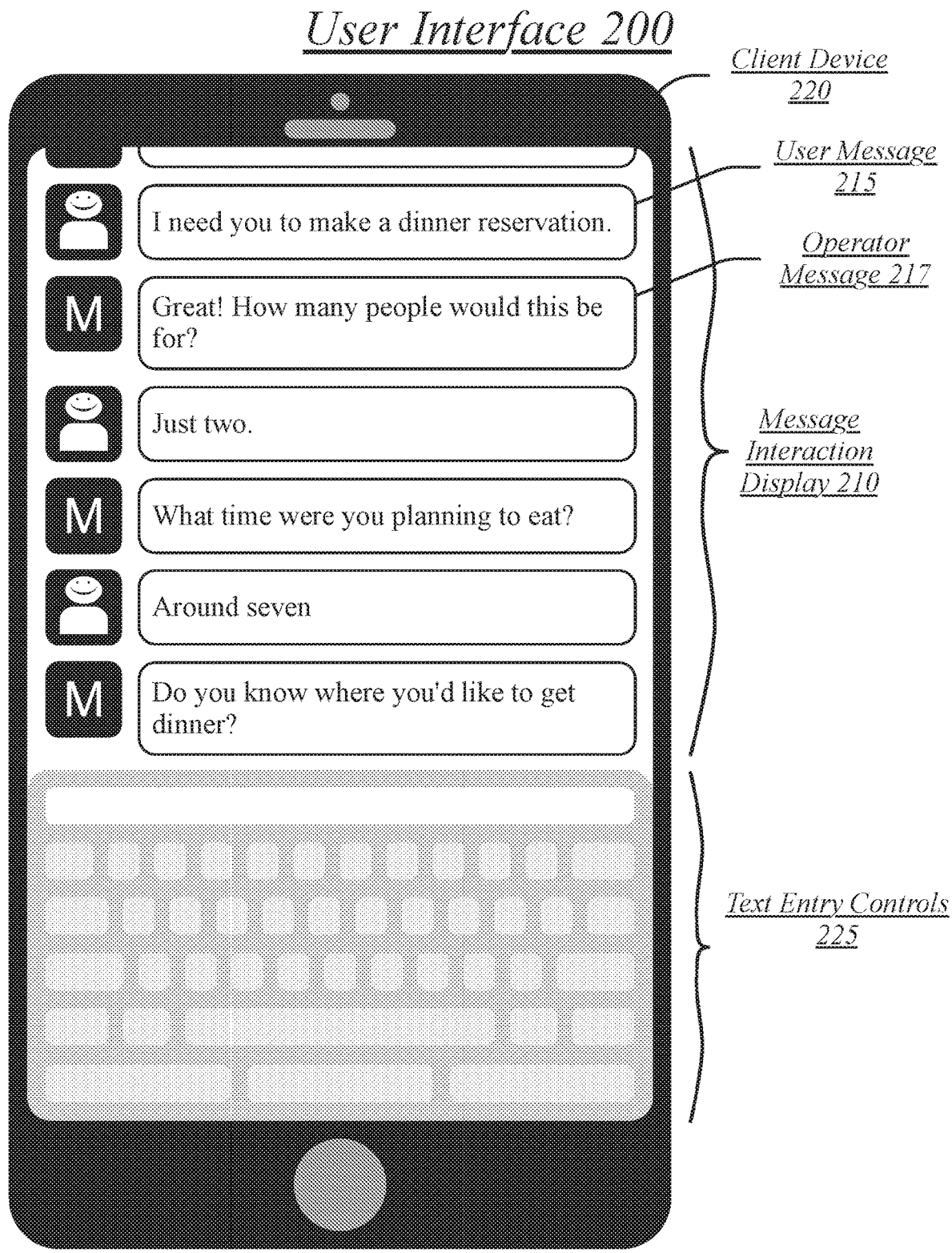
FIG. 2 illustrates an embodiment of a user client user interface.

FIG. 2 illustrates an embodiment of a user client user interface 200.

A user interface 200 may be displayed on a client device 220. The client device 220 may correspond to, without limitation, a smartphone device 150, a personal computer device 180, a tablet device 160, or any other form of client device. The user interface 200 may be displayed via a web browser, such as may execute on a smartphone device 150, tablet device 160, personal computer device 180, or other device. The user interface 200 may be displayed in a messaging application, such as may execute on a smartphone device 150, tablet device 160, personal computer device 180, or other device. The user interface 200 may be displayed in a personal service application, such as may execute on a smartphone device 150, tablet device 160, personal computer device 180, or other device. The user interface 200 may be displayed using a variety of techniques, without limitation to the examples listed here.

A user interface 200 may include a message interaction display 210. A message interaction display 210 may comprise a series of messages exchanged between a user of the client device 220 and an operator for a personal service system 190. A message interaction display 210 may include a user message 215 of a plurality of user messages. User messages may be displayed in association with an avatar for the user. A message interaction display 210 may include an operator message 217 of a plurality of operator messages. Operator messages may be displayed in association with an avatar for the operator and/or for the personal service system 190. The message interaction display 210 may, in some cases, only visibly include a portion of the user messages and operator messages, such as due to limited screen space of the client device 220.

A client device 220 may include controls for operating the user interface 200. The controls may include text entry controls 225 empowering the entering of text for the composition of text-based messages. The controls may include hardware controls. In some embodiments, controls may be touchscreen-based controls.

Figure 3A:
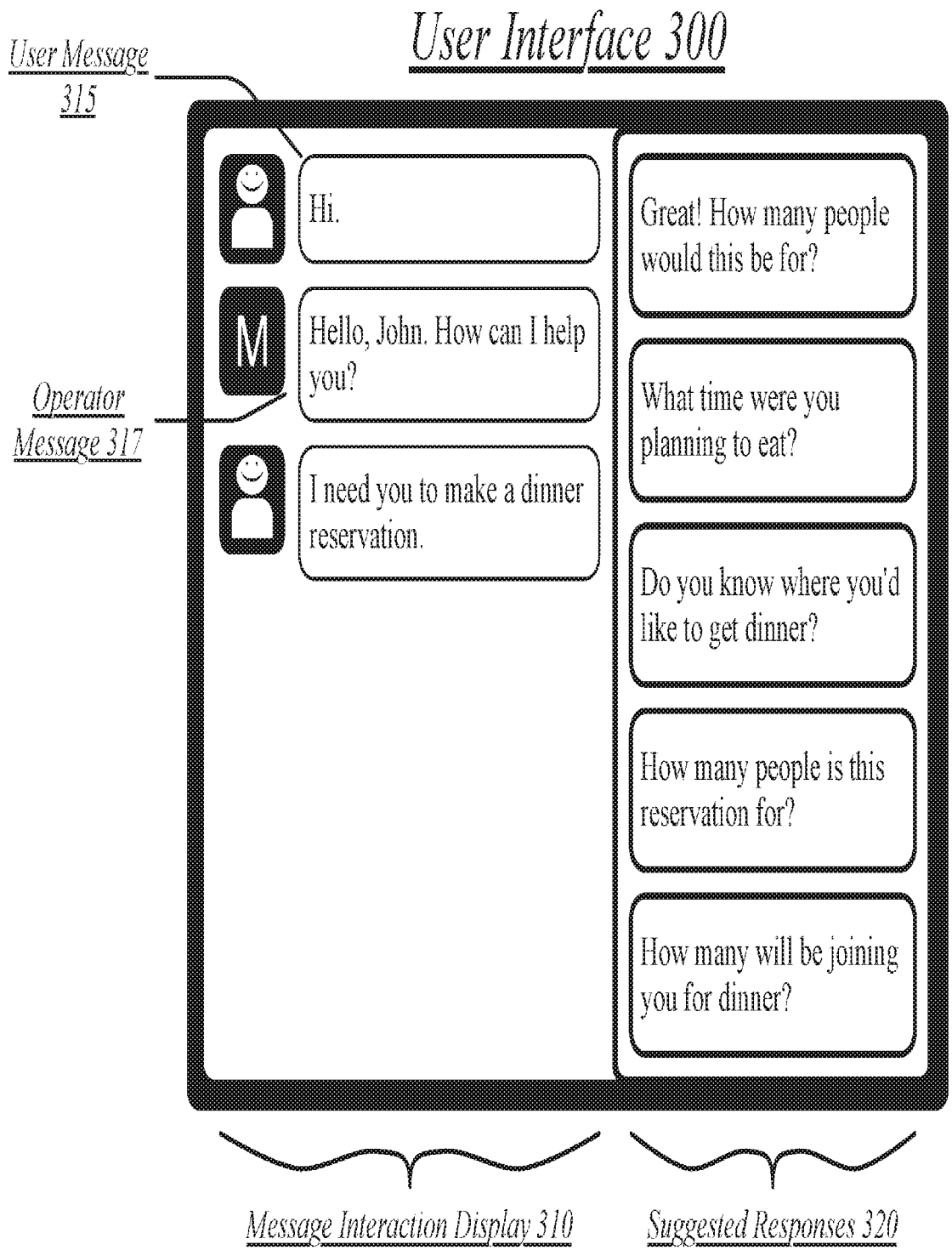
FIG. 3A illustrates an embodiment of an operator console user interface.

FIG. 3A illustrates an embodiment of an operator console user interface 300.

The user interface 300 may comprise the user interface for an operator console. An operator console may comprise a software application operating as a front-end to the personal service system 190 for an operator. An operator may correspond to a human engaged to perform personal services for the personal service system 190 on behalf of users of the personal service system 190.

The operator console may serve, among other functions, as an access point to a messaging platform used to transmit messages for the personal service system 190. The user interface 300 for the operator console may display a user message 315 of a plurality of user messages. The user interface 300 for the operator console may display an operator message 317 of a plurality of operator messages. The user messages and operator messages may be displayed in a message interaction display 310 of the user interface 300.

The user interface 300 for the operator console may include one or more suggested response 320. The suggested responses 320 may be determined according to NLP techniques by an NLP component based on the messaging conversation related to a particular user request, as may be updated in response to a most-recent user message. Suggested responses 320 may comprise one or more suggestions generated using natural language processing techniques based on historic user-operator interactions. The operator of the operator console may be empowered to selected one of the suggested responses 320 to select the selected suggested response for transmission to the user. In some cases, a selected suggested response may be modified by the operator prior to transmission, such as to customize the response to the particular user or the particular context of the user. In some cases, the operator may enter a response other than the suggested responses 320 for transmission to the user. The operator console may respond to messaging controls, particularly text controls, for the entering of messaging commands, including text.

Figure 3B:
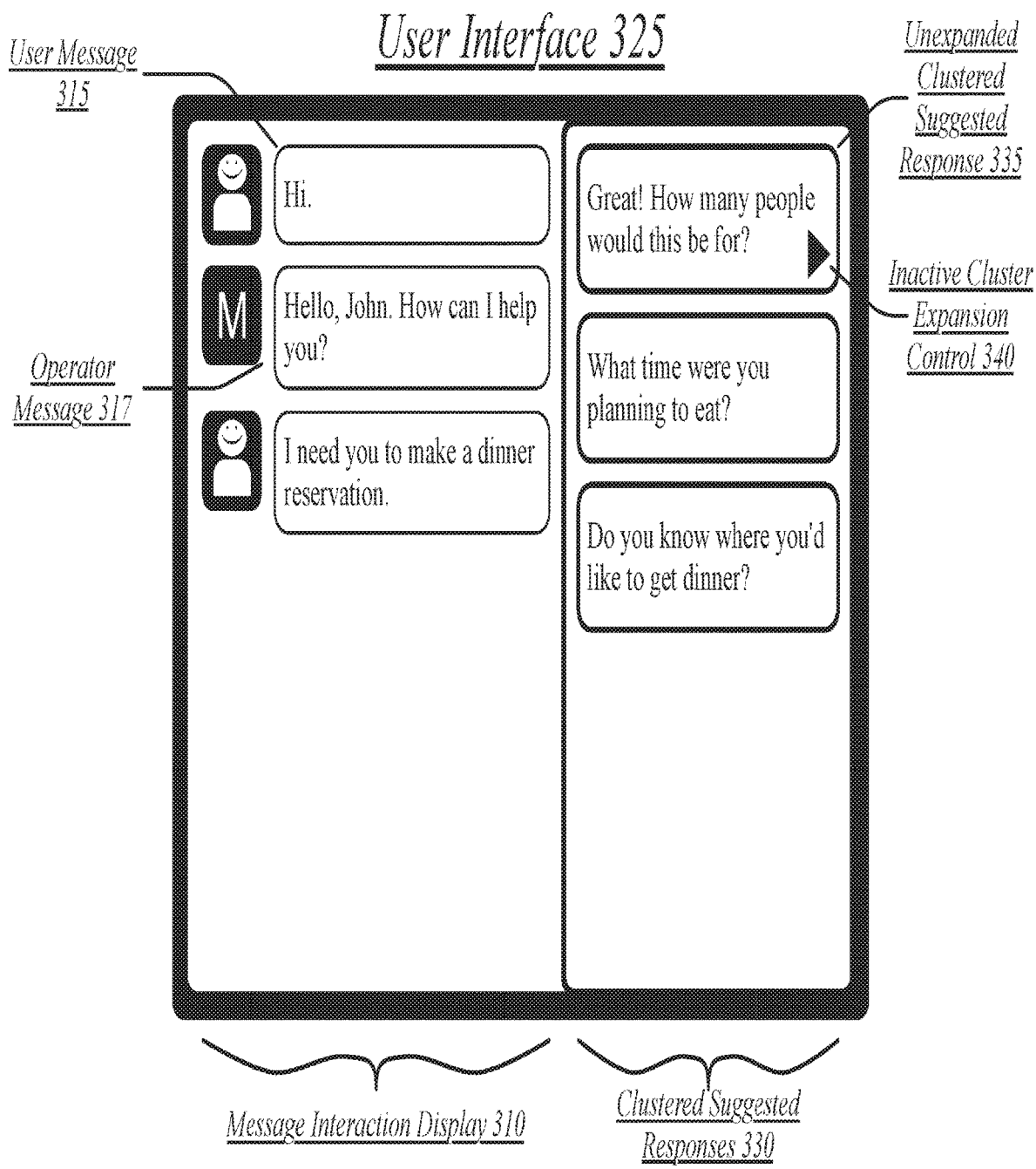
FIG. 3B illustrates an embodiment of an operator console user interface with unexpanded clustered suggested responses.

FIG. 3B illustrates an embodiment of an operator console user interface 325 with unexpanded clustered suggested responses 335.

As illustrated in FIG. 3A, in some cases, some of the suggested response 320 may be similar. For example, "Great! How many people would this be for?", "How many people is this reservation for?", and "How many will be joining you for dinner?", while distinct text, express a similar query. NLP techniques may be used to cluster similar responses, such that at least some portion of suggested responses are grouped together into a cluster.

In some embodiments, suggested responses may be ordered according to rankings determined by the NLP techniques, with higher-ranked suggested responses displayed with a higher priority, such as more prominently in a user interface, such as at the beginning of a list of suggested responses. In some of these embodiments, a suggested response from each cluster may be displayed prior to the display of a second suggested response from any cluster. A highest-ranked suggested response from each cluster may be selected and displayed for the operator of the operator console with a higher priority than any other suggested response from each cluster.

In some embodiments, the suggested responses provided by a NLP component may be displayed as clustered suggested responses 330 in which only the highest-ranked suggested response of each cluster is displayed. However, each suggested response with other suggested responses in its cluster may be displayed as an unexpanded clustered suggested response 335 with a cluster expansion control empowering expansion of the responses clustered with the highest-ranked response of the cluster of suggested responses.

A clustered suggested response may be associated with a cluster expansion control, the cluster expansion control empowering the viewing of additional clustered suggested responses. An unexpanded clustered suggested response 335 may be associated with an inactive cluster expansion control 340, the inactive cluster expansion control 340 communicating that additional clustered suggested responses of a lower ranking than the displayed highest-ranking clustered suggested response are available. The selection of the inactive cluster expansion control 340 may activate the inactive cluster expansion control 340 and result in the display of the additional lower-ranking clustered suggested responses.

Figure 3C:
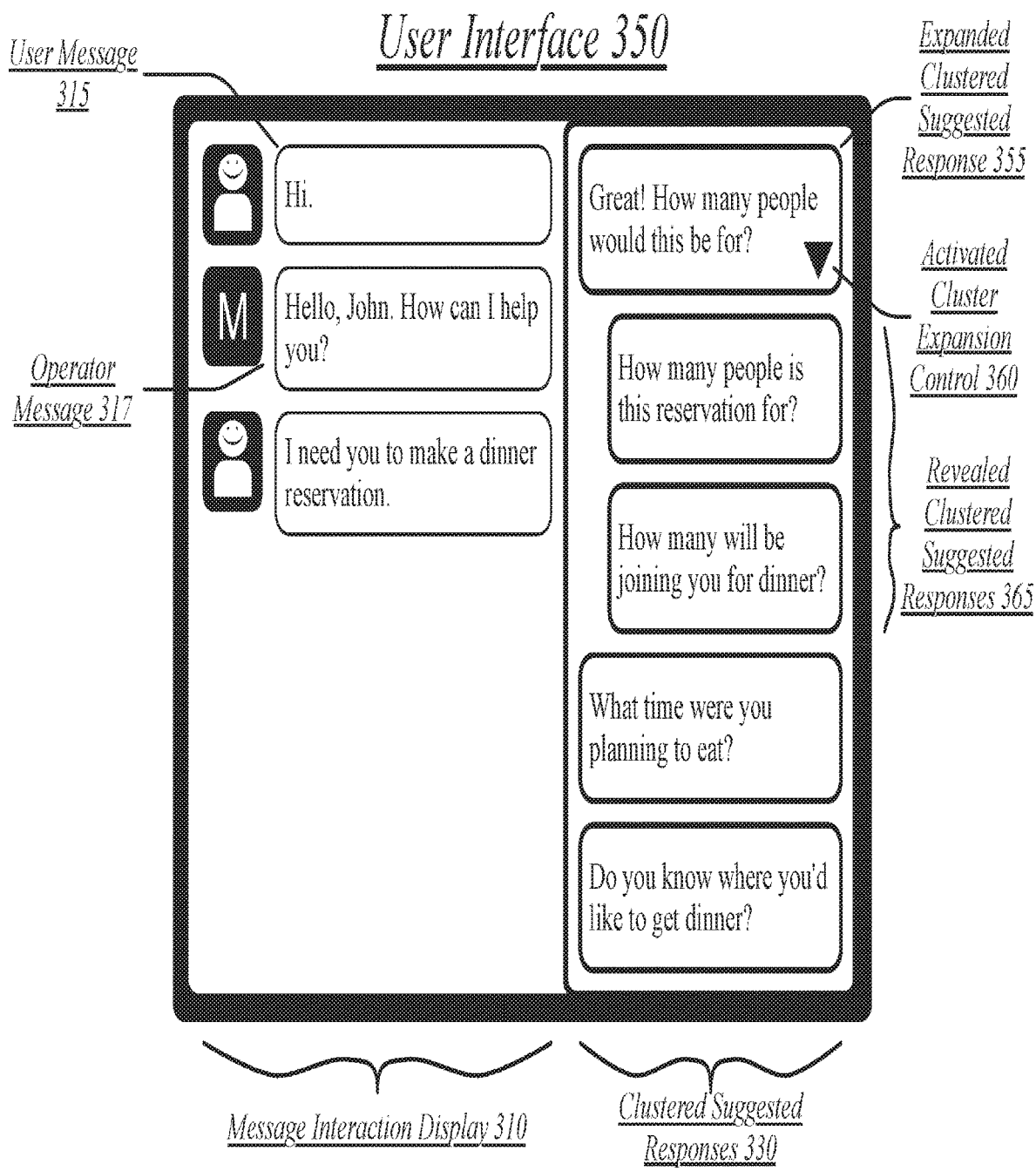
FIG. 3C illustrates an embodiment of an operator console user interface with expanded clustered suggested responses.

FIG. 3C illustrates an embodiment of an operator console user interface 350 with expanded clustered suggested responses 355.

In response to the selection of an inactive cluster expansion control 340, an operator console may transition to an expanded cluster suggested responses 355 with revealed clustered suggested responses 365. The revealed clustered suggested responses 365 may comprise one or more additional suggested responses in the same cluster as the highest-ranking clustered suggested response initially displayed as the unexpanded clustered suggested response 335. The expanded cluster suggested responses 355 may be displayed with an activated cluster expansion control 360. It will be appreciated that other techniques may be used for the indication that additional clustered suggested responses are available and for the activation of the display of the additional clustered suggested responses.

Figure 4:
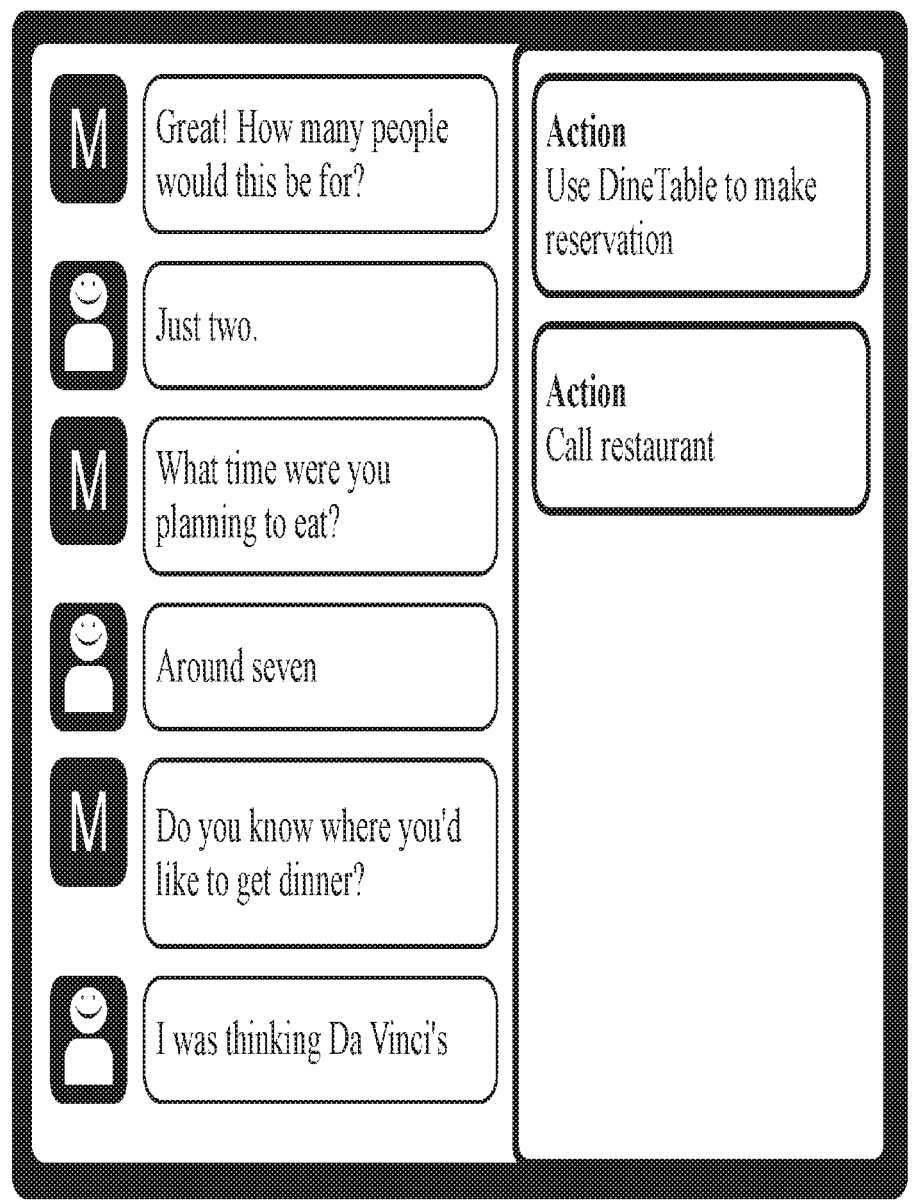
FIG. 4 illustrates an embodiment of an operator console user interface with suggested responses including application program interface actions.

FIG. 4 illustrates an embodiment of an operator console user interface 400 with suggested responses 420 including application program interface actions.

In some cases, the suggested responses 420 may include application program interface (API) actions. An API action may comprise a response that, instead of being transmitted to the user client, involves interaction with a third party. An API action may comprise a voice call, a web page transaction, an application transaction, or any other transaction distinct from communication with the user client. In some cases, API actions may be suggested in combination with messaging responses to the user. In general, API actions may comprise instructions to the operator of the operator console providing guidance to the operator for the performance of a user request. Operator instructions may be provided by an NLP component once sufficient information has been gathered regarding a user request such that the operator may carry out the user request.

Figure 5:
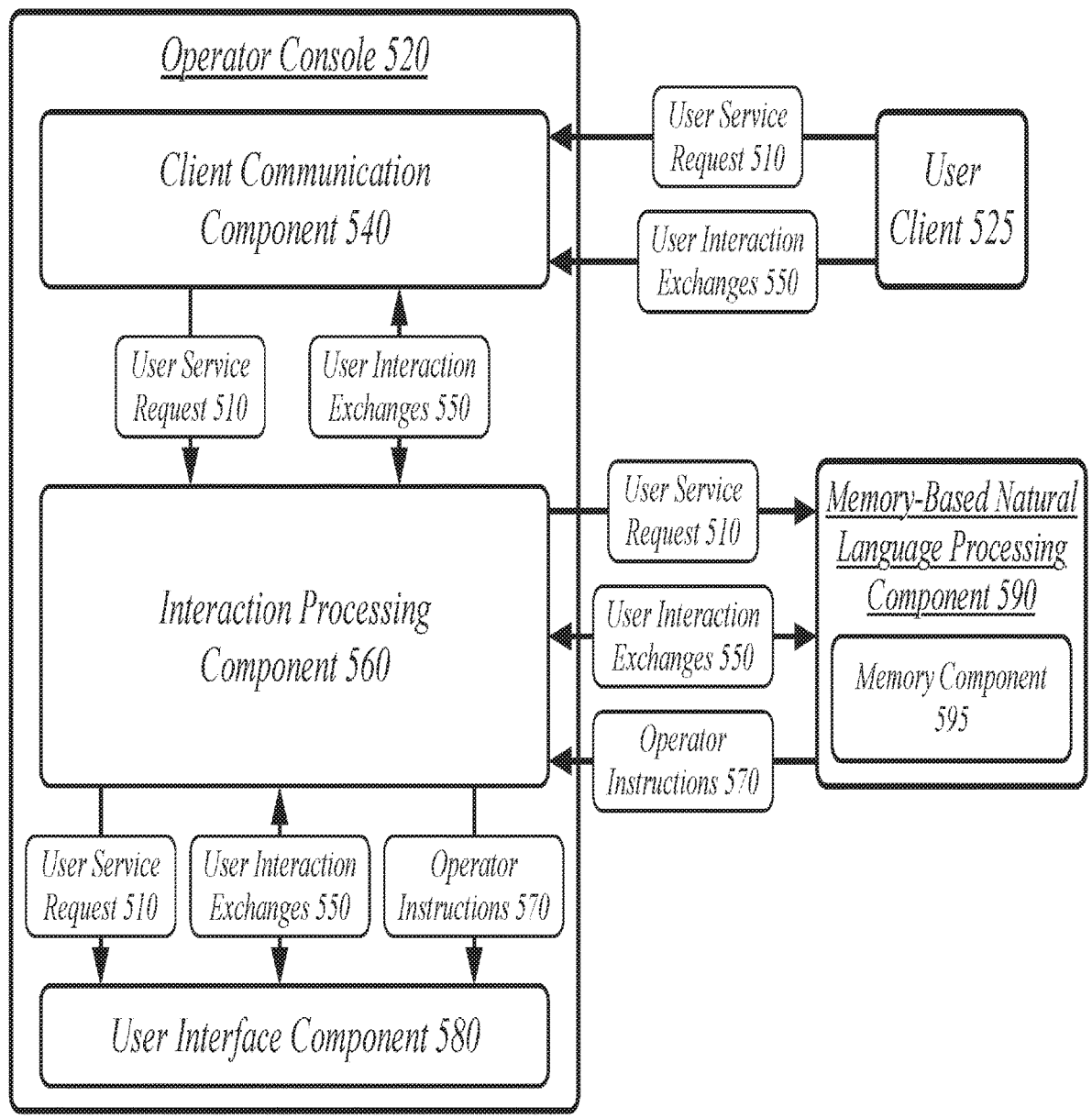
FIG. 5 illustrates an embodiment user service request being processed by a user request communication system.

FIG. 5 illustrates an embodiment user service request 510 being processed by a user request communication system 100.

An operator console 520 may empower an operator to engage with users of the personal service system 190 to respond to and fulfill user service requests. The operator console 520 may interact with a memory-based natural language processing (NLP) component 590, submitting personal service request messaging information to the memory-based NLP component 590 and receiving suggested responses, including both suggested messages and suggested operator instructions, in response. A memory-based NLP component 590 may operate according to NLP techniques that include a memory of interactions stored in a memory component 595. For instance, the memory-based NLP component 590 may used memory neural network (MNN) techniques. The operator console 520 may fill this memory component 595 with interactions that include all of messages received from the user, messages sent by the operator, and actions taken by the operator in the fulfillment of a user service request 510. The memory-based NLP component 590 may use NLP techniques in which the output of the memory-based NLP component 590 depends on the contents of the memory component 595. The operator console 520 may comprise a plurality of software components.

An operator console 520 may comprise a client communication component 540. A client communication component 540 may be generally arranged to exchange information, such as via messages, with client devices for the performance of user service requests. In some embodiments, the client communication component 540 may receive messages directly from the client devices, in which the messages are directly addressed in network communication to a computer device executing the operator console 520 or to a server system for the personal service system 190. In other embodiments, the client communication component 540 may receive messages via a messaging platform, in which the messages are addressed within the messaging platform according to a user identifier or service identifier by the messaging platform.

The client communication component may receive a user service request 510 from a user client 525. A user service request 510 may comprise a textual message comprising a natural-language request for the performance of a personal service. A user service request 510 may be received in response to the user client 525 submitting the user service request 510 to a personal service system 190 and the personal service system 190 routing the user service request 510 to an available operator console 520. An operator console 520 may be available where the operator console 520 has an operator that is online and is not currently servicing another user, or, generally, where the operator console 520 has an operator ready to respond to a user service request 510. The client communication component 540 may receive the user service request 510 and forward it to an interaction processing component 560.

The operator console 520 may comprise an interaction processing component 560. The interaction processing component may be generally arranged to interoperate with a memory-based NLP component 590 to generate suggested responses for an operator of the operator console 520 based on a history of the messaging interactions related to a particular user service request 510. This history of the messaging interactions may include responses suggested by the memory-based NLP component 590.

The operator console 520 may submit the user service request to the memory-based NLP component 590. In response the memory based NLP component 590 may return output, the output comprising a set of suggested responses. These suggested responses may comprise one or more suggested messages for transmission to the user of the user client 525 and/or may comprise one or more suggested operator instructions for performance by an operator of the operator console 520.

The operator console 520 may comprise a user interface component 580. The user interface component 580 may be generally arranged to display and receive operator commands via a user interface for the operator console 520. The user interface component 580 may display messaging interactions between an operator of the operator console 520 and a user of the user client 525. The user interface may display a set of suggested responses in the operator console 520. The user interface may display one or more operator instructions 570 in the operator console 520.

The user interface may receive a selection of a selected suggested response of a set of suggested responses via the operator console 520. Where a selected suggested response is a suggested operator message, the client communication component 540 may forward the selected suggested response to the client communication component 540, which may then transmit the selected suggested response to the user client 525. Where a selected suggested response is a suggested operator instruction, the user interface component may instantiate an application program interface (API) operation in response to the selection of the selected suggested response.

The operator console 520 may be operative to engage in API operations for interactions with third parties other than the personal service system 190 or users of the personal service system 190. API operations may comprise the use of an API to engage with a third party.

An API operation may comprise making a voice call, such as a phone call or voice-over-internet-protocol (VoIP) call. The user interface component 580 may be operative to engage a voice call carried out through the operator console 520 or otherwise available to be monitored by the operator console 520. The destination phone number and length of a voice call may be logged by the operator console 520, with one or both made available to the memory-based NLP component 590. The contents of a voice call may be represented as a transcript in the memory component 595 of the memory-based NLP component 590. The memory-based NLP component 590 may therefore be able to analyze the results of a voice call, to learn when to suggest a voice call, to suggest that an operator make a voice call, and to suggest specific tasks that may be accomplished using a voice call.

An API operation may comprise accessing a web site. The user interface component 580 may be operative to provide access to a web client through the operator console 520 or otherwise available to be monitored by the operator console 520. The destination address (i.e., uniform resource locator (URL)) or addresses may be logged by the operator console 520. The link(s) selected may be logged by the operator console 520. The length of time used in accessing the web site may be logged by the operator console 520. In general, any element of accessing a web site may be logged by the operator console 520. Any logged element of accessing a web site may be provided to the memory-based NLP component 590 and stored in the memory component 595. The memory-based NLP component 590 may therefore be able to analyze the accessing of a web site, to learn when to suggest accessing a web site, to suggest that an operator access a web site, and to suggest specific tasks that may be accomplished using a web site.

An API operation may comprise using a service-specific application, provider-specific application, service-specific API, provider-specific API, or other technique for accessing a specific service provider. The user interface component 580 may provide access to a specific service provider for the operator console. Elements of access to the specific service provider may be logged, provided to the memory-based NLP component 590, and stored in the memory component 595. The memory-based NLP component 590 may therefore be able to analyze access to a specific service provider, to learn when to suggest access to a specific service provider, to suggest that an operator access a specific service provider, and to suggest specific tasks that may be accomplished through access to a specific service provider.

The interaction processing component 560 may generate a series of user interaction exchanges 550 with the user client 525 based on output from the memory-based NLP component 590. The series of user interaction exchanges 550 may include a plurality of user messages sent from the user client 525 to the operator console 520. The series of user interaction exchanges may include a plurality of operator messages sent from the operator console 520 to the user client 525. The series of user interaction exchanges 550 may generally comprise the exchange of messages between the user and the operator to query, clarify, and specify details of a user service request 510 and the performance of a user service request 510.

The series of user interaction exchanges 550 may be represented in the memory component 595 of the memory-based NLP component 590. The interaction processing component 560 may provide the user service request 510 to the memory-based NLP component 590 for stored in the memory component 595. The memory-based NLP component 590 may generate a set of suggested responses to the user service request 510 and provide the set of suggested responses to the interaction processing component 560 for display via the user interface component 580. A selected suggested response, or another response entered by an operator of the operator console 520, may be received via the user interface component 580. The selected suggested response may then be both transmitted to the user client 525 via the client communication component 540 and stored in the memory component 595 of the memory-based NLP component 590. The user may respond to this operator message with another user message. This iterative exchange of user messages and operator messages may comprise the user interaction exchanges 550s. The memory-based NLP component 590 may continue to suggest operator messages for transmission to the user client 525 based on this growing set of user interaction exchanges 550.

A portion of the output from the memory-based NLP component 590 may comprise one or more operator instructions 570. Operator instructions 570 may comprise instructions for the performance of the task(s) requested via the user service request 510 and may generally correspond to instructions for the completion of user-requested personal service. Operator instructions 570 may include instructions for the use of third-party entities, such as through API access, including, without limitation, making voice calls, using web sites, and using service- or provider-specific APIs. The interaction processing component 560 may receive one or more operator instructions 570 for the performance of the user service request 510 from the memory-based NLP component 590 and provide the operator instructions 570 to the user interface component 580. The user interface component 580 may display the one or more operator instructions 570. The operator may choose to act on one or more of the one or more operator instructions 570, such as may include the use of API functions of the operator console 520.

The memory-based NLP component 590 may be trained based on a live data set, a live data set being a data set generated from the real-world operator of the personal service system 190 using actual operators and actual users. Operators may be selected for an initial training as possessing particularly skillful operation skills to provide for high-quality training, but function as actual, real-world operators due to responding to real user service requests and actually performing the requested services. In other embodiments, the memory-based NLP component 590 may be partially or completely trained on toy, non-live, or other artificially generated data sets generated without the actual servicing of actual user service requests.

A live data set may comprise a plurality of series of user interaction exchanges between a plurality of operator consoles and a plurality of user clients. A live data set may include a plurality of API interaction exchanges engaged by the plurality of operator consoles. A live data set may include a plurality of voice communication transcripts engaged by the plurality of operator consoles. The live data set may be provided to the memory-based NLP component 590 for machine learning using machine learning techniques.

The user request communication system 100 may preprocess the plurality of series of user interaction exchanges of the data set to replace request-specific information with placeholder text. This may be used to generalize the user interaction exchanges so as to over-fitting the machine learning to the specifics of the data set. For instance, the request-specific information may comprise one or more of name information, contact information, financial information, price information, participant information, and location information. The memory-based NLP component 590 may better learn the patterns of responding to user service requests without the temptation of fitting to specific names, contacts, financial details, prices, participants, locations, or other specific elements of a user service request. Additionally, the removal of this specific information and replacement with placeholder text may serve to anonymize the data set so as to protect the privacy of the users of the personal service system 190.

In some cases, placeholder text may use a single placeholder text for all request-specific text of a particular type. For example, all credit card information may be replaced with text such as "CCINFO". All price information may be replaced with text such as "PRICEINFO". In some cases, placeholder text may use different placeholder text for different request-specific text of a particular type where multiple instances of request-specific text of that type is in a particular message or series of exchanges. For instance, if multiple names are used in a series of exchanges, each distinct name may be replaced by a different placeholder, with the same placeholder used for each repeated instance of the same name. For example, repeated instances in a particular exchange of the name "Edwin Johns" may be replaced by "NAME1", with an instance of the name "Janet Smith" replaced by "NAME2".

The operator console 520 may post-process a selected suggested response prior to transmitting the selected suggested response to the user client 525 to replace one or more placeholder texts with user-specific information. For instance, the placeholder text for a person's name may be replaced with the specific name of the user. The placeholder text for a service-provider's name (e.g., a restaurant name) may be replaced with the name for the specific service provider. In general, the personal service system 190 may maintain user-specific information for each user of the personal service system 190, which the operator console 520 may substitute in for placeholder text. In some embodiments, the placeholder text replacement may be specifically applied to the selected suggested response by the interaction processing component 560 after selection of the selected suggested response and prior to transmission of the selected suggested response to the user. In other embodiments, the set of suggested responses may all be post-processed prior to displaying the set of suggested responses to add user-specific information.

Similarly, responses may be pre-processed prior to machine learning to remove one or more of punctuation and capitalization, thereby generalizing the text for easier machine learning. As such, suggested responses may be post-processed by the interaction processing component 560 prior to display by the user interface component 580 to add one or more of punctuation and capitalization.

In some embodiments, the memory-based NLP component 590 may cluster responses in the data set upon which it learns. Clustered responses may comprise responses that are detected to be similar. Clustering may be performed using known clustering techniques, such as k-means. Where the output from the memory-based NLP component 590 comprises a set of suggested responses, the user interface component 580 may display clustered responses using user interface techniques that communicate the clustering. The user interface component 580 may detect two or more clustered suggested responses of the set of suggested responses based on a response clustering by the memory-based NLP component 590, combine the two or more clustered suggested responses into a combined suggested response, and display the combined suggested response in the operator console 520.

In some embodiments, the memory-based NLP component 590 may adjust its suggested responses based on live feedback during the performance of the user request communication system 100. The interaction processing component 560 may increase the weight of the selected suggested response with the memory-based NLP component 590 in response to the user interface component 580 receiving a selection of the selected suggested response via the operator console 520. Increasing the weight of the selected suggested response may be operative to increase the prominence of the selected suggested response for the memory-based NLP component 590 and thereby increase the probability of the selected suggested response being selected by the memory-based NLP component 590. Increasing the weight of the selected suggested response may be operative to increase the ranking of the selected suggested response for the memory-based NLP component 590, thereby increase the ranking of the selected suggested response within a particular cluster, and thereby increase the prominence of the selected suggested response in a combined display of clustered suggested responses. In some embodiments, the live feedback may be operator-specific, learning the preferences of a particular operator. Additionally or alternatively, the ongoing performance of the user request communication system 100 may be logged and periodically used for machine learning to update the performance of the memory-based NLP component 590.

In some embodiments, the interaction processing component 560 may pre-load the memory component 595 of the memory-based NLP component 590 with user-specific information. The user-specific information may represent service preferences that may be used to better respond to a user's request. For example, a user preference for a particular type of food (e.g., sushi), for a particular type of transport (e.g., ride-sharing over traditional cab), or any other user preference may be represented. The user-specific information may be expressed in a natural language format similar to the other natural language statements from an interaction exchange that will be stored in the memory component 595 so as to be subject to the same natural language processing techniques otherwise used by the memory-based NLP component 590.

In some cases, at least a portion of the user-specific information may be generated by a profile, such as a social-networking profile, for a user of the user client 525. The profile may comprise structured data representing user-specific information, such as user likes and dislikes. This profile may be automatically translated to a natural language format and pre-loaded into the memory component 595. In some cases, at least a portion of the user-specific information may be natural language statements made by the user and stored for later re-use. The user interface component 580 may receive a user-information control selection by the operator via the operator console 520 in relation to a user statement. In response, the interaction processing component 560 may add the user statement to the user-specific information pre-loaded into the memory component 595 for interactions with the user client 525. For example, the operator may query a user as to their dining preferences and receive a natural-language statement in response from the user expressing their preferences (e.g., "I'm a fan of Asian cuisine, but also love trying new things."). This statement may be flagged by the operator for inclusion in future pre-loading so as to provide preference information to the memory-based NLP component 590 for future interactions. This statement may be added to a pre-loading registry associated with the user of the user client 525.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receiving a user service request from a user client at block 602.

The logic flow 600 may submitting the user service request to a memory-based natural language processing component at block 604.

The logic flow 600 may generating a series of user interaction exchanges with the user client based on output from the memory-based natural language processing component, wherein the series of user interaction exchanges are represented in a memory component of the memory-based natural language processing component at block 606.

The logic flow 600 may receiving one or more operator instructions for the performance of the user service request from the memory-based natural language processing component at block 608.

The logic flow 600 may displaying the one or more operator instructions in an operator console at block 610.

The embodiments are not limited to this example.

Figure 7:
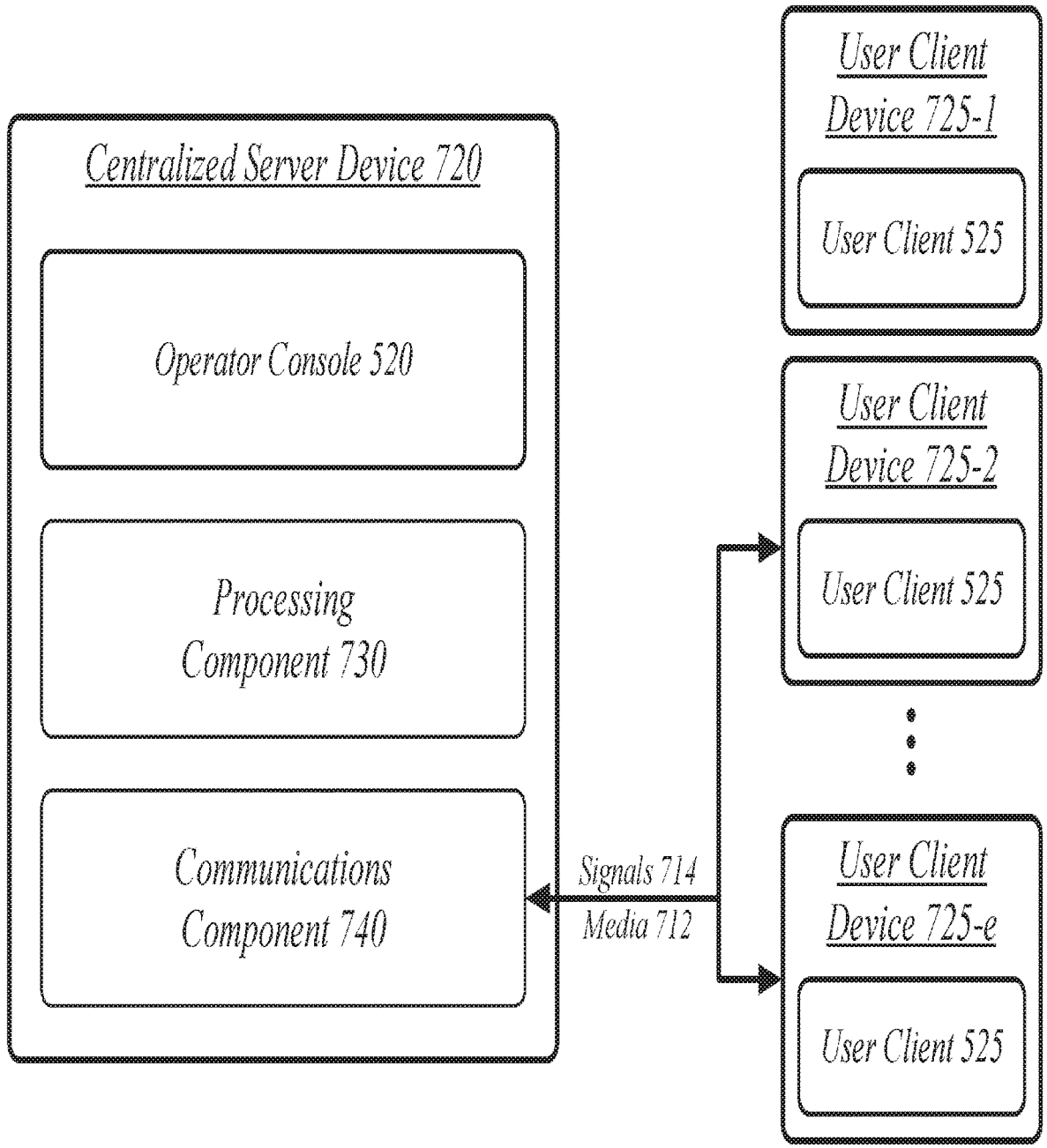
FIG. 7 illustrates an embodiment of a centralized system for the system of FIG. 1.

FIG. 7 illustrates a block diagram of a centralized system 700. The centralized system 700 may implement some or all of the structure and/or operations for the user request communication system 100 in a single computing entity, such as entirely within a single centralized server device 720.

The centralized server device 720 may comprise any electronic device capable of receiving, processing, and sending information for the user request communication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the user request communication system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the user request communication system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The centralized server device 720 may execute an operator console 520 used by an operator of the personal service system 190. The centralized server device 720 may directly communicate with one or more user client devices 725 each executing a user client 525, without the intermediation of a messaging platform.

Figure 8:
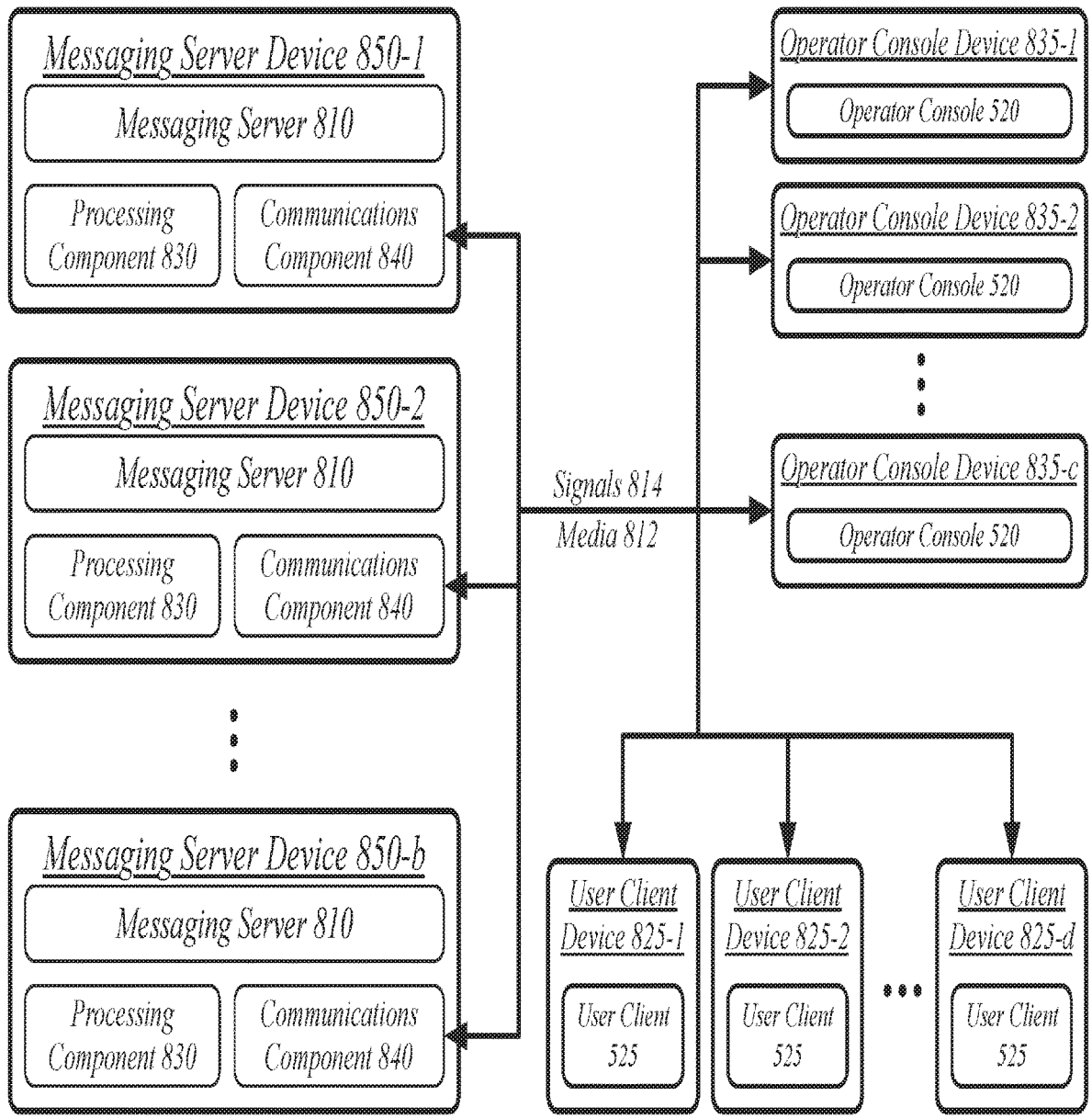
FIG. 8 illustrates an embodiment of a distributed system for the system of FIG. 1.

FIG. 8 illustrates a block diagram of a distributed system 800. The distributed system 800 may distribute portions of the structure and/or operations for the user request communication system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 850. In general, the server devices 850 may be the same or similar to the centralized server device 720 as described with reference to FIG. 7. For instance, the server devices 850 may each comprise a processing component 830 and a communications component 840 which are the same or similar to the processing component 730 and the communications component 740, respectively, as described with reference to FIG. 7. In another example, the server devices 850 may communicate over a communications media 812 using communications signals 814 via the communications components 840.

The server devices 850 may comprise or employ one or more server programs that operate to perform various methodologies in accordance with the described embodiments. In one embodiment, for example, the second server device 850 may each implement a messaging server 810, corresponding to the messaging servers 110 described with reference to FIG. 1. The messaging servers may communicate with a plurality of devices using signals 814 transmitted over media 812. The messaging servers may intermediate between a plurality of operator console devices 835, each executing an operator console 520 used by an operator of the personal service system 190, and a plurality of user client devices 825, each executing a user client 525 used by a user of the personal service system 190.

Figure 9:
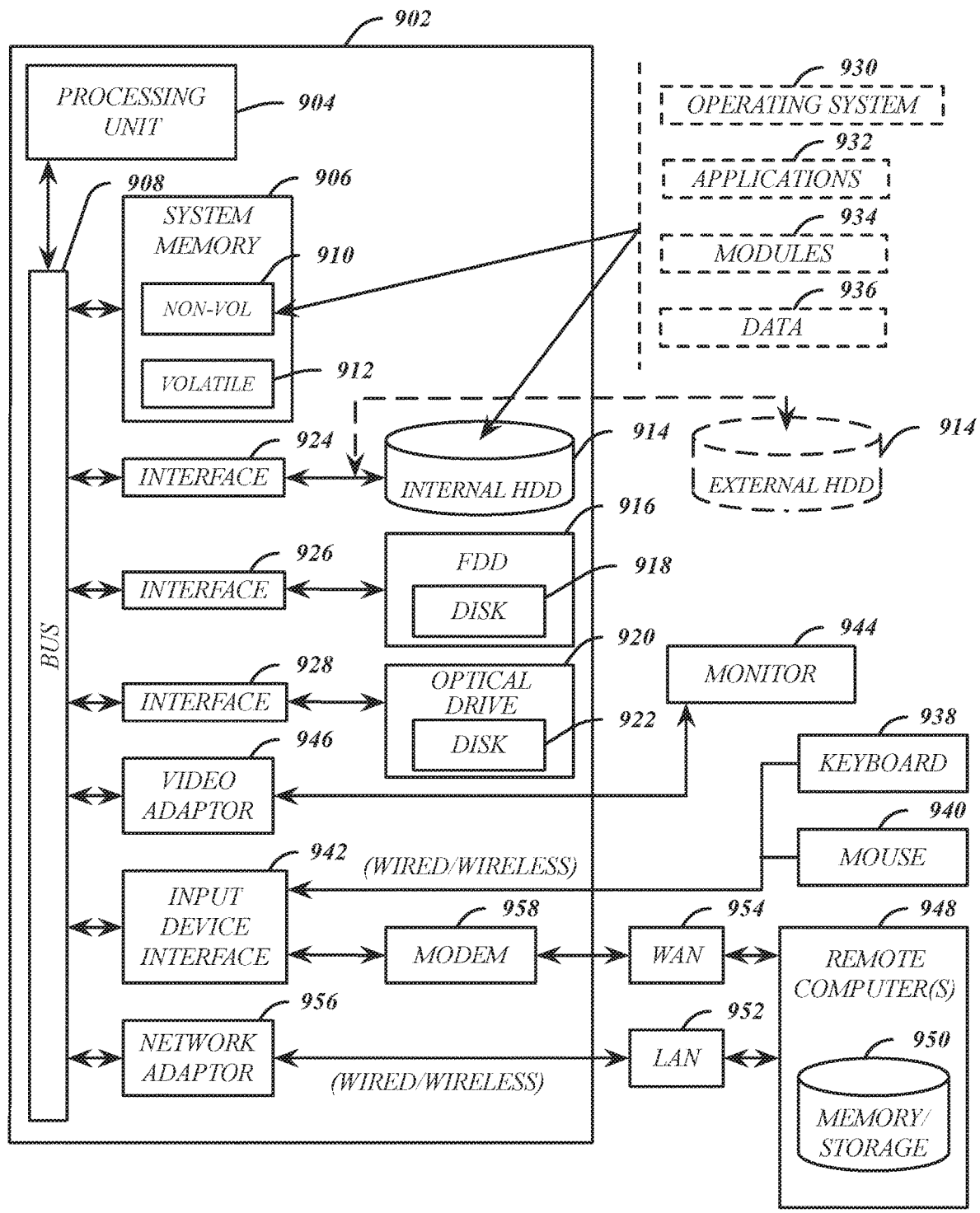
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the user request communication system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
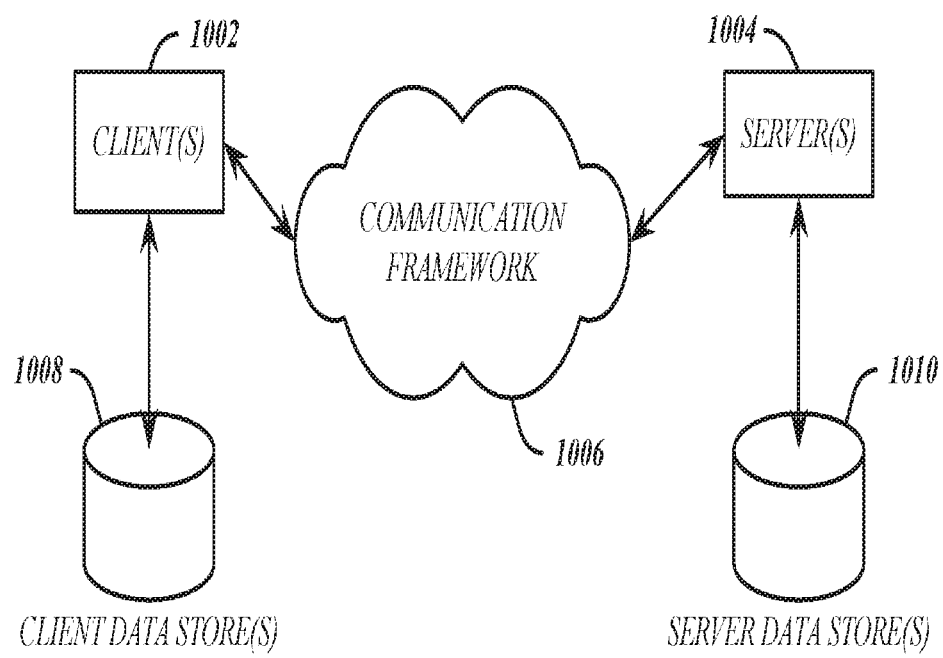
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client devices 725, 825 and operator console devices 835. The servers 1004 may implement the server devices 720, 850 The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
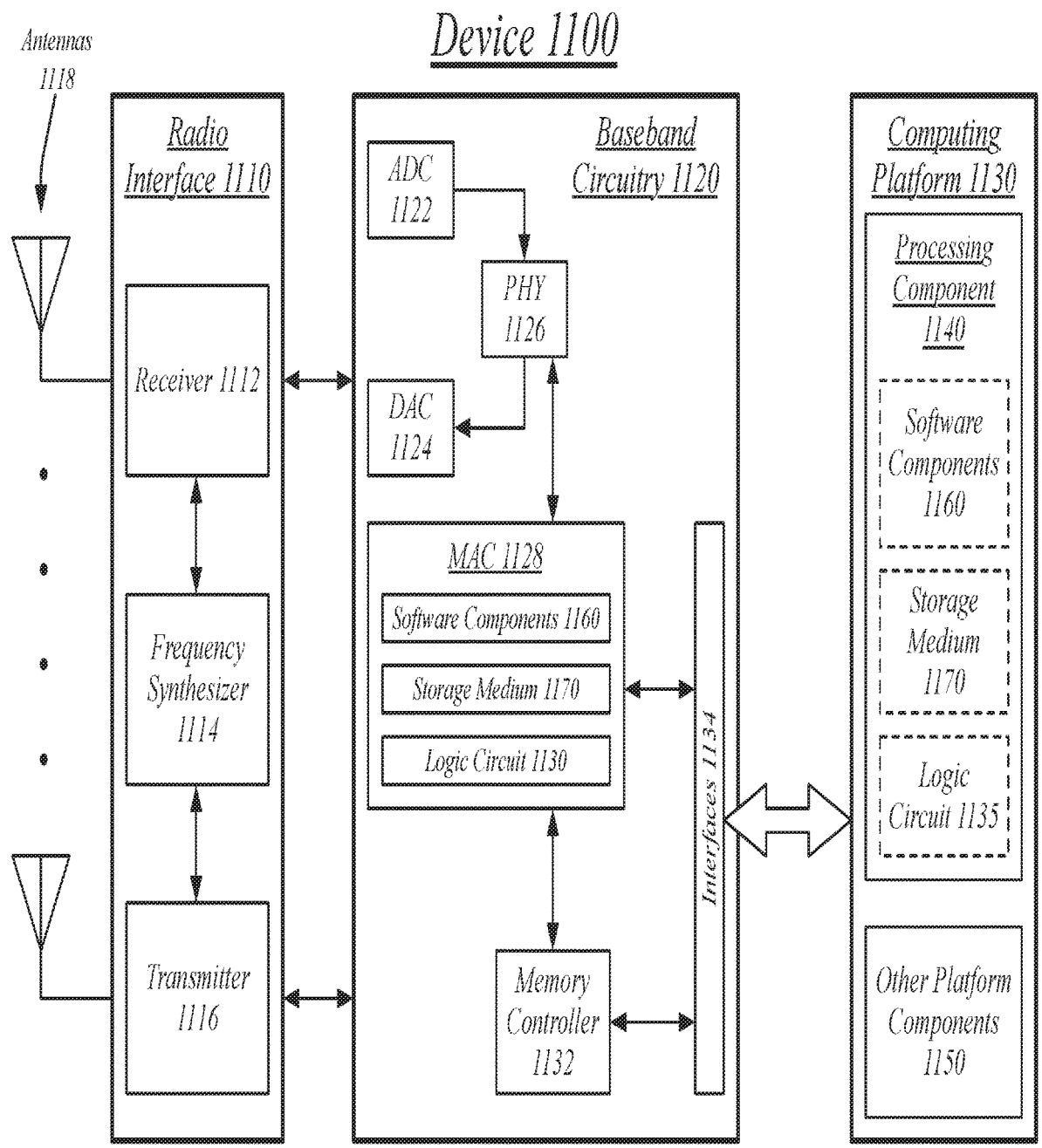
FIG. 11 illustrates an embodiment of a radio device architecture.

FIG. 11 illustrates an embodiment of a device 1100 for use in a multicarrier OFDM system, such as the user request communication system 100. Device 1100 may implement, for example, software components 1160 as described with reference to user request communication system 100 and/or a logic circuit 1135. The logic circuit 1135 may include physical circuits to perform operations described for the user request communication system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the user request communication system 100 and/or logic circuit 1135 in a single computing entity, such as entirely within a single device. Alternatively, the device 1100 may distribute portions of the structure and/or operations for the user request communication system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the user request communication system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a user service request from a user client; submitting the user service request to a memory-based natural language processing component; generating a series of user interaction exchanges with the user client based on output from the memory-based natural language processing component, wherein the series of user interaction exchanges are represented in a memory component of the memory-based natural language processing component; receiving one or more operator instructions for the performance of the user service request from the memory-based natural language processing component; and displaying the one or more operator instructions in an operator console.

A computer-implemented method may further comprise the memory-based natural language processing component trained based on a live data set, the live data set including a plurality of series of user interaction exchanges between a plurality of operator consoles and a plurality of user clients.

A computer-implemented method may further comprise the live data set including a plurality of application program interface interaction exchanges engaged by the plurality of operator consoles.

A computer-implemented method may further comprise the live data set including a plurality of voice communication transcripts engaged by the plurality of operator consoles.

A computer-implemented method may further comprise the output from the memory-based natural language processing component comprising a set of suggested responses, further comprising: displaying the set of suggested responses in the operator console; receiving a selected suggested response of the set of suggested responses via the operator console; and transmitting the selected suggested response to the user client.

A computer-implemented method may further comprise post-processing the selected suggested response prior to transmitting the selected suggested response to the user client to replace one or more placeholder texts with user-specific information.

A computer-implemented method may further comprise post-processing the set of suggested responses prior to displaying the set of suggested responses in the operator console to add one or more of punctuation, capitalization, and user-specific information.

A computer-implemented method may further comprise increasing the weight of the selected suggested response with the memory-based natural language processing component in response to receiving a selection of the selected suggested response via the operator console.

A computer-implemented method may further comprise pre-processing a plurality of series of user interaction exchanges to replace request-specific information with placeholder text, the request-specific information comprising one or more of name information, contact information, financial information, price information, participant information, and location information.

A computer-implemented method may further comprise the output from the memory-based natural language processing component comprising a set of suggested responses, further comprising: detecting two or more clustered suggested responses of the set of suggested responses based on a response clustering by the memory-based natural language processing component; combining the two or more clustered suggested responses into a combined suggested response; and displaying the combined suggested response in the operator console.

A computer-implemented method may further comprise pre-loading the memory component of the memory-based natural language processing component with user-specific information, the user-specific information expressed in a natural language format.

A computer-implemented method may further comprise receiving a user-information control selection via the operator console in relation to a user statement; and adding the user statement to the user-specific information pre-loaded into the memory component for interactions with the user client.

A computer-implemented method may further comprise at least a portion of the user-specific information generated from a social-networking profile for a user of the user client.

An apparatus may comprise a processor circuit on a device; a client communication component operative on the processor circuit to receive a user service request from a user client; an interaction processing component operative on the processor circuit to submit the user service request to a memory-based natural language processing component; generate a series of user interaction exchanges with the user client based on output from the memory-based natural language processing component, wherein the series of user interaction exchanges are represented in a memory component of the memory-based natural language processing component; and receive one or more operator instructions for the performance of the user service request from the memory-based natural language processing component; and a user interface component operative on the processor circuit to display the one or more operator instructions in an operator console. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method for predictively responding to user requests, comprising:
   displaying, at an operator console, an operator interface for an operator for addressing user requests from a user client, the user client distinct from the operator;
   displaying, in a message interaction display portion of the operator interface, a user request received from the user client;
   submitting the user request to a natural language processing component;
   receiving one or more suggested operator responses to the user request from the natural language processing component;
   receiving one or more suggested operator actions to be taken by the operator on behalf of the user client to address the user request from the natural language processing component, the suggested operator actions involving interactions with third-parties distinct from a communication with the user client;
displaying the suggested operator responses and suggested operator actions in a suggested responses portion of the operator interface;
receiving a selection of one of the one or more suggested operator responses;
transferring the selected suggested operator response from the suggested responses portion of the operator interface to the message interaction display portion of the operator interface; and
transmitting the selected suggested operator response to the user client.

2. The method of claim 1 further comprising:
receiving one or more operator instructions from the natural language processing component for providing guidance to an operator of the operator interface for addressing the user request; and
displaying the one or more operator instructions in the suggested responses portion of the operator interface.

3. The method of claim 1 wherein the suggested operator actions are accessed via a provider-specific application programming interface provided by a third-party.

4. The method of claim 3 wherein the suggested operator actions include one or more of a voice call, a web page transaction and an application transaction.

5. The method of claim 1, further comprising:
pre-processing the user request to replace user-specific information with placeholder text; and
post-processing the selected suggested operator response prior to transmitting the selected suggested operator response to the user client to replace the placeholder text with the user-specific information.

6. The method of claim 1 wherein the plurality of suggested operator responses is displayed in an ordered list, the list being ordered in accordance with rankings determined by the natural language processing component, with higher-ranked suggested operator responses displayed more prominently in the suggested responses portion of the operator interface.

7. The method of claim 6 wherein the plurality of suggested operator responses includes clustered responses, the clustered responses comprising a plurality of suggested operator responses that have been detected as being similar to each other, the clustered responses displaying the highest-ranked suggested operator response in the cluster, further comprising:
a cluster expansion control that, when selected, replaces the highest-ranked suggested operator response with a listing of all clustered responses.

8. The method of claim 1 wherein the natural language processing component is trained based on a live data set, the live data set including a plurality of exchanges between a plurality of operators and a plurality of user clients, the live data set further including the selected suggested operator response.

9. An apparatus for predictively responding to user requests, comprising:
a processor circuit on a device;
an operator console;
a client communication component operative on the processor circuit to receive the user request from a user client;
an interaction processing component operative on the processor circuit to:
submit the user request to a natural language processing component, the natural language processing component trained based on a live data set, the live data set including a plurality of exchanges between a plurality of operators and a plurality of user clients, the live data set including a plurality of application program interface interactions engaged by the plurality of operators;
receive one or more suggested operator responses to the user request from the natural language processing component;
receive one or more suggested operator actions to be taken by the operator on behalf of the user client to address the user request from the natural language processing component, the suggested operator actions involving interactions with third-parties distinct from a communication with the user client; and
a user interface component operative on the processor circuit to:
display, at the operator console, an operator interface for an operator for addressing user requests from a user client, the user client distinct from the operator;
display the suggested operator responses and suggested operator actions in a suggested responses portion of the operator interface;
receive a selection of one of the one or more suggested operator responses; and
transfer the selected suggested operator response from the suggested responses portion of the operator interface to a message interaction display portion of the operator interface; and
the client communication component further operative to transmit the selected suggested operator response to the user client.

10. The apparatus of claim 9, the interaction processing component further operative on the processor circuit to receive one or more operator instructions for providing guidance to an operator for addressing the user request; and the user interface component further operative on the processor circuit to display the one or more operator instructions in the suggested responses portion of the operator interface.

11. The apparatus of claim 9 wherein the suggested operator actions are accessed via a provider-specific application programming interface provided by a third-party.

12. The apparatus of claim 11 wherein the suggested operator actions include one or more of a voice call, a webpage transaction in an application transaction.

13. The apparatus of claim 9, the interaction processing component further operative on the processor circuit to:
pre-process the user request by replacing user-specific information with placeholder text; and
post-process the selected suggested operator response prior to transmitting the selected suggested operator response to the user client to replace the placeholder text with the user-specific information.

14. The apparatus of claim 9 wherein the plurality of suggested operator responses is displayed in an ordered list, the list being ordered in accordance with rankings determined by the natural language processing component, with higher-ranked suggested operator responses displayed more prominently in the suggested responses portion of the user interface, the interaction processing component further operative on the processor to:
increase the ranking of the selected suggested operator response with the natural language processing component in response to receiving the selection of the selected suggested operator response.

15. The apparatus of claim 14 wherein the one or more suggested operator responses includes clustered responses, the clustered responses comprising a plurality of suggested operator responses that have been detected as being similar to each other, the user interface component further operative on the processor circuit to:
 display the highest-ranked suggested operator response in the cluster,
 provide a cluster expansion control;
 receive a selection of the cluster expansion control; and
 replace the highest-ranked suggested operator response with a listing of all clustered responses in response to receiving the selection of the cluster expansion control.

16. At least one non-transitory computer-readable storage medium comprising instructions implementing a system for predictively responding to user requests, the instructions, that, when executed, cause the system to:
 display, at an operator console, an operator interface for an operator for addressing user requests from a user client, the user client distinct from the operator;
 receive a user request from the user client and display the user request in a message interaction display portion of the operator interface;
 submit the user request to a natural language processing component;
 receive one or more suggested operator responses to the user request from the natural language processing component;
 receive one or more suggested operator actions to be taken by the operator on behalf of the user client to address the user request from the natural language processing component, the suggested operator actions involving interactions with third-parties distinct from a communication with the user, wherein the suggested operator actions are accessed via a provider-specific application programming interface provided by a third party;
 display the suggested operator responses and the suggested operator actions in a suggested responses portion of the operator interface;
 receive a selection of one of the one or more suggested operator responses;
 transfer the selected suggested operator response from the suggested responses portion of the operator console to the message interaction display portion of the operator console; and
 transmit the selected suggested operator response to the user client.

17. The non-transitory computer-readable storage medium of claim 16, comprising further instructions that, when executed, cause the system to:
 receive one or more operator instructions from the natural language processing component for providing guidance to an operator of the operator interface for addressing the user request; and
 display the one or more operator instructions in the suggested responses portion of the operator interface.

18. The non-transitory computer-readable storage medium of claim 16, comprising further instructions that, when executed, cause a system to:
 pre-process the user request to replace user-specific information with placeholder text, the user-specific information comprising one or more of name information, contact information, financial information, price information, participant information, and location information; and
 post-process the selected suggested operator response prior to transmitting the selected suggested operator response to the user client to replace placeholder text with user-specific information.

19. The non-transitory computer-readable storage medium of claim 16 wherein the plurality of suggested operator responses includes clustered responses, the clustered responses comprising a plurality of suggested operator responses that have been detected as being similar to each other, comprising further instructions that, when executed, cause a system to
 display a highest-ranked suggested operator response in the cluster;
 display a cluster expansion control;
 receive a selection of the cluster expansion control; and
 replace the highest-ranked response with a listing of all clustered responses in response to receiving the selection of the cluster expansion control.

20. The non-transitory computer-readable storage medium of claim 16 wherein the natural language processing component is trained based on a live data set, the live data set including a plurality of exchanges between a plurality of operators and a plurality of user clients, the live data set including a plurality of application program interface interaction exchanges engaged by the plurality of operators.

* * * * *